MAGNETIC MODULATOR

Filed Feb. 13, 1957

WITNESSES
Robert C. Baird
James F. Young

INVENTORS
Bennett L. Freeman &
Benjamin H. Vester, Jr.
BY
F. H. Murray
ATTORNEY

United States Patent Office 2,814,738 Patented Nov. 26, 1957

2,814,738

MAGNETIC MODULATOR

Bennett L. Freeman, Baltimore, and Benjamin H. Vester, Jr., Catonsville, Md., assignors to Westinghouse Electric Corporation, East Pittsburgh, Pa., a corporation of Pennsylvania Application February 13, 1957, Serial No. 639,895

11 Claims. (Cl. 307—106)

Figure 1:
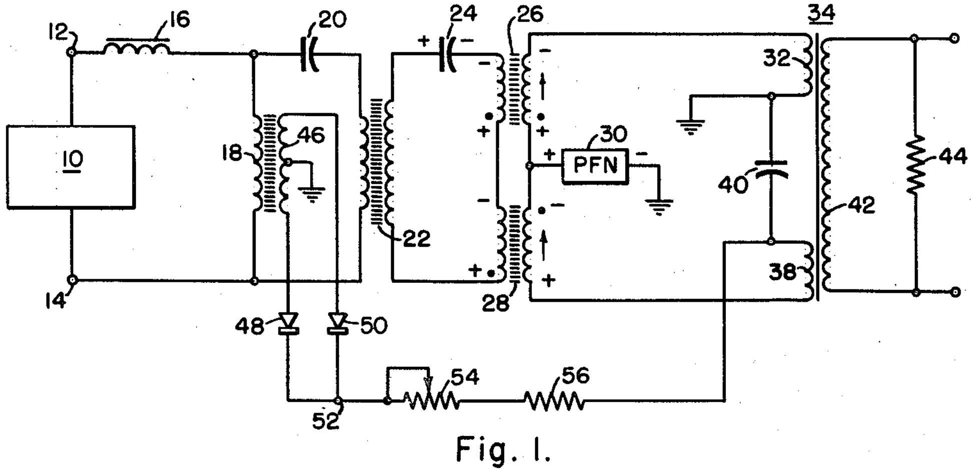

This invention relates to apparatus employing saturable inductor devices for generating output voltage of short time duration, and more particularly to a pulse generator for converting an alternating current input signal into a series of unipolarity output voltage pulses having a repetition rate double the frequency of the alternating current input signal.

In radar installations and the like requiring rugged equipment which is impervious to high shock and vibration loads, the magnetic modulator or pulse generator has found general acceptance over thyratron pulse generators which are relatively fragile in construction. As is well known, the pulse repetition rate of such magnetic modulators is inherently limited to the fundamental and even multiples of the source frequency. Multiplication of the source frequency is accomplished by appropriate application of an externally supplied direct current bias to the saturable reactors in the modulator. That is, by applying a direct current bias to the reactors they can be made to saturate in one direction only so that the output from the reactor is dissymmetric (i. e. of one polarity). The direct current polarizing of the saturable reactors in such modulators is not such as to produce a direct current component in the so-called power winding of the reactor, but rather to promote the generation of even harmonics in the circuit, these harmonics being such as to give the maximum degree of dissymmetry (i. e., one polarity) of the voltage waveform about the zero time axis.

In most magnetic modulators, the saturable reactors or pulse-sharpening stages are cascaded, the input voltage for each stage being essentially the output voltage of the preceding stage. All magnetic elements, whether saturating or not, are basically symmetrical and hence will give only odd harmonic distortion (i. e., bipolarity output) unless they are biased with a direct current. When the reactors are biased, they produce even harmonics, in addition to odd harmonics. Prior to this invention, all stages in the magnetic modulator were generally biased with a direct current voltage to maintain the required dissymmetry with each successive stage of pulse sharpening. Since, however, the magnetic characteristics of each of the stages could change, it was necessary to adjust the bias voltage for each stage in order to obtain the desired output wave shape.

It is an object of this invention to provide a new and improved magnetic modulator in which the desired even harmonic distortion is achieved in only the final stage of the modulator, thereby eliminating the need of separate bias adjustment for each of the stages.

Another object of the invention is to provide a magnetic modulator which will effectively shunt out any post-pulse oscillations following the main power pulse supplied to the modulator. Most magnetic modulators of the type described above are employed to fire magnetrons or the like. One of the problems associated with these modulators is the oscillation of the voltage across the magnetron following the power pulse. These oscillations, called post-pulse oscillations, are frequently of sufficient amplitude to refire the magnetron subsequent to the main pulse from the modulator. The oscillations are due to the switching action of the magnetron which fails to continue conduction as the voltage across it decays below its firing level. The switching action of the magnetron thus causes incomplete discharge of the energy in the pulse-forming network of the modulator. In addition to the energy left over in the pulse-forming network, some energy is also stored in the other circuit elements of the modulator, and this left over energy is dissipated by the oscillations which take place, the total time for dissipation being somewhat long due to the relatively high Q and low resonant frequency of the components in the circuit. In the present invention, post-pulse oscillations are eliminated by achieving frequency doubling in the last stage of the modulator.

The above and other objects and teachings of the invention will become apparent from the following detailed description taken in connection with the accompanying drawings which form a part of this specification and in which:

Fig. 1 is a schematic circuit diagram of one embodiment of the invention; and

Figure 2A:
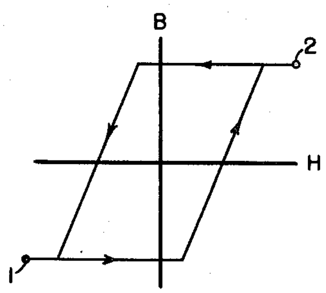
Figure 2B:
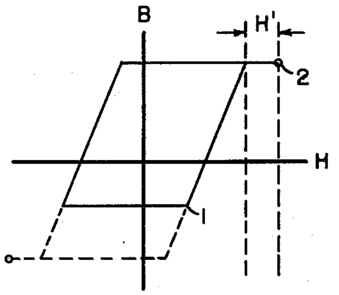

Figs. 2*a* and 2*b* show hysteresis loops of the magnetic core material employed in the various saturable reactors and transformers of the invention.

Referring to Fig. 1, there is shown a source of alternating current voltage 10 having a pair of output terminals 12 and 14. Between terminals 12 and 14 are connected an inductive choke 16 and a first saturable reactor 18. A capacitor 20 and the primary winding of a saturable core transformer 22 are connected in shunt with reactor 18, substantially as shown.

A capacitor 24 and the primary windings of second and third saturable core transformers 26 and 28 are connected in a closed loop series arrangement with the secondary winding of transformer 22. As shown, the secondary windings of transformers 26 and 28 have a common terminal which is connected to one terminal of a pulse-forming network 30, the other terminal of which is grounded. Pulse-forming networks of this type are well known in the art and consist of inductances and condensers which may be put together in any one of a number of possible configurations. The configuration chosen for the particular purpose at hand depends primarily upon the specific pulser characteristic desired. The values of the inductance and capacitance elements in such a network can be calculated to give an arbitrary pulse shape when the pulse duration, impedance and load characteristics are specified. For a full and detailed description of the theory and construction of various types of pulse-forming networks, reference may be had to volume 5 (Pulse Generators) of the MIT Radiation Laboratories Series, McGraw-Hill Book Company, Incorporated, New York, 1948.

The uncommon terminal of the secondary winding of the transformer 26 is connected to ground through one primary winding 32 of a non-saturating pulse transformer 34. In a similar manner, the uncommon terminal of the secondary winding of transformer 28 is connected to ground through a second primary winding 38 of the transformer 34 and a capacitor 40. Output voltages from the modulator are derived from across winding 42 on transformer 34 and are applied to a magnetron or other similar device, represented by the load impedance 44.

Referring again to reactor 18, it can be seen that a winding 46, having its center tap grounded, is inductively coupled to the core of this reactor. The opposite ends of the winding 46 are connected through rectifiers 48 and 50 to a common terminal 52. Resistors 54 and 56, in turn, connect this terminal to the junction of winding 38 and capacitor 40. As will be understood, a direct current flows from terminal 52 through the secondary windings of transformers 26 and 28 to ground, the arrangement being such as to bias the cores of transformers 26 and 28.

With reference to transformers 26 and 28, points of like instantaneous induced voltage are indicated by dots. Thus, if the dots are on the same end of the primary and secondary windings as in transformer 26, the polarities of the induced voltages on the primary and secondary windings will always coincide, whereas, if the dots are on the opposite ends of the windings, as in transformer 28, the polarities of the induced voltages on the primary and secondary windings will always be opposed.

All of the saturable reactors in the circuit of Fig. 1 are wound on cores of square hysteresis loop material. The hysteresis curve for this type of material is shown in Figs. 2*a* and 2*b*. In accordance with well-known magnetic theory, the quantity H represents the field intensity at any instant and is measured in ampere-turns per unit of length. The quantity B represents flux density at any instant and is measured in webers per square unit of area. It can be seen that the core material presents a sharp cutoff point between conditions of saturation (i. e., constant B as H increases) and unsaturation. When a reactor is saturated it will, of course, present a much lower impedance than when unsaturated. If an alternating current voltage is applied to the reactor, it may advance from point 1 on the charging cycle in Fig. 2*a* along the path of the arrows to point 2 and then back down the other side of the curve to point 1. The cycle from point 1 to point 2 and back to point 1 represents one 360° cycle of the applied alternating current voltage. The change of flux density B in Fig. 2*a* from point 1 to point 2 is proportional to the integral of the voltage induced across the reactor with respect to time. If the integral of the applied voltage is equal to or greater than the integral represented between points 1 and 2, then the core will saturate.

Field intensity H varies in direct proportion to ampere-turns which are, in turn, dependent upon applied voltage. Therefore, by applying fixed bias voltage to the reactor, it can be made to saturate in one direction only. This factor is illustrated in Fig. 2*b*. By applying a bias voltage, the point 2 can be made to shift to the right by the amount H′. The point 1 is now located on the steep side of the curve so that the reactor saturates in one direction only. By reversing the polarity of the bias voltage, point 1 can be made to shift to the left by distance H′; and under this condition, point 2 will not be in the saturation range.

Referring again to Fig. 1, it will be seen that the voltage from rectifiers 48 and 50 applied across the secondary windings of transformers 26 and 28 with the polarity shown constitutes a bias voltage. Furthermore, since the windings on transformer 26 are wound in the same manner while the windings on transformer 28 are wound in opposite direction, transformer 26 will saturate when the polarity of the voltage applied across the primary windings has one sense, while transformer 28 will saturate when the voltage across the primary windings is of the other sense.

In operation, inductor 16 and capacitor 20 form an A. C. resonant charging circuit which is tuned to resonate with the source frequency. Capacitor 20 charges to a resonant peak during each half cycle of the applied voltage at which time reactor 18 will saturate and capacitor 20 will discharge through the primary winding of transformer 22. During this time, the alternating current source 10 is isolated from the remainder of the circuit by means of charging choke 16 so that current will not flow back into the source. Saturable transformer 22, which was saturated during the time that capacitor 20 was charging, is forced out of saturation by the discharge of the capacitor. Consequently, the voltage in capacitor

20 will be coupled through transformer 22 to capacitor 24. When a maximum charge accumulates on capacitor 24, saturable transformer 22 again saturates and presents a low impedance to the capacitor 24. Consequently, capacitor 24 will now discharge through the primary windings of transformers 26 and 28 to charge the pulse-forming network 30.

When the polarity of the voltage across capacitor 24 and the primary windings of transformers 26 and 28 is as shown in the drawings, the voltage on the primary winding of transformer 26 will drive its core to saturation before transformer 28 saturates. Consequently, transformer 26 will permit the pulse-forming network 30 to discharge through winding 32 and produce an output pulse across winding 42.

On the next half cycle when the polarity across capacitor 24 is reversed with respect to that shown in the drawing, the pulse-forming network 30 will again charge, but now the transformer 28 will saturate first rather than transformer 26. When transformer 28 saturates, the pulse-forming network again discharges, but this time it discharges through winding 38 to produce a second output pulse across winding 42. Since the pulse-forming network 30 charges with opposite polarities on every other half cycle of the applied voltage source, the currents flowing through windings 32 and 38 will produce output pulses across winding 42 of one polarity. Furthermore, two output pulses will be produced during each cycle of the applied alternating current voltage so that an effective pulse doubling occurs.

The arrangement shown also prevents post-pulse oscillations described in the introductory portion of the specification. Considering the half cycle when transformer 26 is to saturate; the voltage discharge from capacitor 24 into the pulse forming network 30 impresses a certain volt-second integral across both of the transformers 26 and 28, the polarity of the voltage being such as to aid the bias current in transformer 26 and oppose it in transformer 28. The net result is that transformer 26 saturates and begins to discharge the pulse forming network into winding 32. During this discharge time, however, the polarity of the voltage across transformer 28 is such as to continue to drive it toward saturation. The circuit conditions are such that as soon as the output pulse is discharged into the load impedance 44, transformer 28 saturates. Thus both transformer 26 and transformer 28 are now saturated to effectively place a short circuit across the output transformer 34. The left-over energy on the pulse forming network is now dissipated as copper losses in the secondary windings of transformers 26 and 28, and windings 32 and 38. It will be noted that with both of the transformers 26 and 28 saturated, current flow from the pulse forming network into transformer 34 is in such a direction as to cancel the inductance of transformer 34. This gives a complete discharge of the left over energy in the pulse forming network without any voltage (i. e., post-pulse oscillations) appearing across winding 42.

Although the invention has been shown in connection with a certain specific embodiment, it will be readily apparent to those skilled in the art that various changes in form and arrangement of parts may be made to suit requirements without departing from the spirit and scope of the invention.

We claim as my invention:

1. Apparatus for converting a source of alternating current input voltage into a series of output voltage pulses of one polarity comprising, in combination, a saturable inductive device, connections for applying said source of alternating current voltage across said inductive device, a first saturable core transformer having primary and secondary windings, a capacitor and the primary winding of said first transformer connected in shunt with said inductive device, second and third saturable core transformers each having a primary and a secondary winding, a capacitor and the primary windings of the second and third saturable transformers connected in a closed circuit series arrangement with the secondary winding of said first transformer, an output transformer having first, second and third winding means inductively associated therewith, a capacitor connecting one terminal of the first winding means to one terminal of the second winding means, means connecting the secondary windings of the second and third saturable transformers in series between the respective other terminals of said first and second winding means, a pulse forming network connected between the junction of said secondary windings and said one terminal of the first winding means, and means for deriving an output voltage from across said third winding means.

2. Apparatus for converting a source of alternating current input voltage into a series of output voltage pulses of one polarity comprising, in combination, a saturable inductive device, connections for applying said source of alternating current voltage across said inductive device, a first saturable core transformer having primary and secondary windings, a capacitor and the primary winding of said first transformer connected in shunt with said inductive device, second and third saturable core transformers each having a primary and a secondary winding, a capacitor and the primary windings of the second and third saturable transformers connected in a closed circuit series arrangement with the secondary winding of said first transformer, an output non-saturating transformer having first, second and third winding means inductively associated therewith, a capacitor connecting one terminal of the first winding means to one terminal of the second winding means, means connecting the secondary windings of the second and third saturable transformers in series between the respective other terminals of said first and second winding means, energy storing means connected between the junction of said secondary windings and the said one terminal of the first winding means, and means for deriving an output voltage from across said third winding means.

3. Apparatus for converting a source of alternating current input voltage into a series of output voltage pulses of one polarity comprising, in combination, a saturable inductive device, connections for applying said source of alternating current voltage across said inductive device, a first saturable core transformer having primary and secondary windings, a capacitor and the primary winding of said first transformer connected in shunt with said inductive device, second and third saturable core transformers each having a primary and a secondary winding, a capacitor and the primary windings of the second and third saturable transformers connected in a closed loop series arrangement with the secondary winding of said first transformer, an output non-saturating transformer having first, second and third winding means inductively associated therewith, a capacitor connecting one terminal of the first winding means to one terminal of the second winding means, means connecting the secondary windings of the second and third saturable transformers in series between the respective other terminals of said first and second winding means, energy storing means connected between the junction of said secondary windings and the said one terminal of the first winding means, means for rectifying a portion of said alternating current voltage source, output terminals for said rectifying means, means for connecting said output terminals to the respective one terminals of said first and second winding means, and means for deriving an output voltage from across said third winding means.

4. Apparatus for converting a source of alternating current input voltage into a series of output voltage pulses of one polarity comprising, in combination, a saturable inductive device, connections for applying said source of alternating current voltage across said inductive device, a first saturable core transformer having primary and secondary windings, a capacitor and the primary winding of said first transformer connected in shunt with said inductive device, second and third saturable core transformers each having a primary and a secondary winding, a capacitor and the primary windings of the second and third saturable transformers connected in a closed loop series arrangement with the secondary winding of said first transformer, an output non-saturating transformer having first, second and third winding means inductively associated therewith, a capacitor connecting one terminal of the first winding means to one terminal of the second winding means, means connecting the secondary winding of the second and third saturable transformers in series between the respective other terminals of said first and second winding means, energy storing means connected between the junction of said secondary windings and the said one terminal of the first winding means, a source of direct current voltage, means for applying said direct current voltage across the secondary windings of said second and third saturable core transformers, and means for deriving an output voltage from across said third winding means.

5. In combination, a saturable inductive device, means for periodically saturating said inductive device, first and second saturable core transformers each having a primary and a secondary winding, a capacitor and the primary winding of the first and second saturable transformers connected in a closed loop series arrangement with said saturable inductive device, a non-saturating transformer having first, second, and third winding means inductively associated therewith, a capacitor connecting one terminal of the first winding means to one terminal of the second winding means, means connecting the secondary windings of the first and second saturable transformers in series between the respective other terminals of said first and second winding means, energy storing means connecting the junction of said secondary windings and the said one terminal of the first winding means, and means for deriving an output voltage from across said third winding means.

6. In combination, a saturable inductive device, means for periodically saturating said inductive device, first and second saturable core transformers each having a primary and a secondary winding, a capacitor and the primary winding of the first and second saturable transformers connected in a closed loop series arrangement with said saturable inductive device, a non-saturating transformer having first, second and third winding means inductively associated therewith, a capacitor connecting one terminal of the first winding means to one terminal of the second winding means, means connecting the secondary windings of the first and second saturable transformers in series between the respective other terminals of said first and second winding means, energy storing means connecting the junction of said secondary windings to said one terminal of the first winding means, a source of direct current voltage, means for applying said direct current voltage across the secondary windings of said first and second saturable core transformers, and means for deriving an output voltage from across said third winding means.

7. In combination, a source of voltage pulses, first and second saturable core transformers each having a primary and a secondary winding, means connecting said primary windings in series across said source of voltage pulses, a non-saturating transformer having first, second and third winding means inductively associated therewith, a capacitor connecting one terminal of the first winding means to one terminal of the second winding means, means connecting the secondary windings of the first and second saturable transformers in series between the respective other terminals of said first and second winding means, and an energy storing device connected between the junction of said secondary windings and the said one terminal of the first winding means, and means for deriving an output voltage from across said third winding means.

8. In combination, a source of voltage pulses, first and second saturable core transformers each having a primary and a secondary winding, means connecting said primary windings in series across said source of voltage pulses, an output transformer having first, second and third winding means inductively associated therewith, a capacitor connecting one terminal of the first winding means to one terminal of the second winding means, means connecting the secondary windings of the first and second saturable transformers in series between the respective other terminals of said first and second winding means, a pulse forming network connected between the junction of said secondary windings and the said one terminal of the first winding means, means for applying a source of direct current voltage across the secondary windings of said first and second saturable core transformers, and means for deriving an output voltage from across said third winding means.

9. In a pulse generator, the combination of first and second saturable inductors, first and second non-saturating inductors, means connecting said saturable and non-saturable inductors in a closed loop series arrangement wherein the saturable inductors are adjacent each other and the non-saturable inductors are adjacent each other, a pulse forming network connecting a point intermediate the saturable inductors to a point intermediate the non-saturable inductors, alternating current means inductively coupled to said saturable inductors for inducing current flow therein to alternately charge said pulse forming network with opposite polarities, and means inductively coupled to said non-saturating inductors for deriving an output voltage from said generator.

10. In a pulse generator, the combination of first and second saturable inductors having a common terminal, first and second non-saturating inductors, a capacitor connecting one terminal of the first non-saturating inductor to one terminal of the second non-saturating inductor, a connection between the other terminal of the first non-saturating inductor and the uncommon terminal of the first saturable inductor, a connection between the other terminal of the second non-saturating inductor and the uncommon terminal of the second saturable inductor, a pulse forming network connected between said common terminal of the saturable inductors and the said one terminal of the first non-saturating inductor, alternating current means inductively coupled to said saturable inductors for inducing current flow therethrough to alternately charge said pulse forming network with opposite polarities, and means inductively coupled to said first and second non-saturating inductors for deriving an output voltage from said generator.

11. In a pulse generator, the combination of first and second saturable inductors having a common terminal, first and second non-saturating inductors, a capacitor connecting one terminal of the first non-saturating inductor to one terminal of the second non-saturating inductor, a connection between the other terminal of the first non-saturating inductor and the uncommon terminal of the first saturable inductor, a connection between the other terminal of the second non-saturating inductor and the uncommon terminal of the second saturable inductor, a pulse forming network connected between said common terminal of the saturable inductors and the said one terminal of the first non-saturating inductor, alternating current means inductively coupled to said saturable inductors for inducing current flow therethrough to alternately charge said pulse forming network with opposite polarities, a source of direct current voltage applied across said first and second saturable inductors, and means inductively coupled to said non-saturable inductors for deriving an output voltage from said generator.

No references cited.